United States Patent [19]
Johnson et al.

[11] Patent Number: 5,826,849
[45] Date of Patent: Oct. 27, 1998

[54] BASE FOR A TETHERED DIGITAL CAMERA

[75] Inventors: Glenn W. Johnson, Webster; Nelson D. Hozman, Rochester, both of N.Y.

[73] Assignee: Eastman Kodak Company, Rochester, N.Y.

[21] Appl. No.: 884,397

[22] Filed: Jun. 27, 1997

[51] Int. Cl.⁶ .................................................. A47B 91/00
[52] U.S. Cl. .................... 248/346.06; 248/278.1
[58] Field of Search ................... 248/910, 133, 248/372.1, 349.1, 346.06, 278.1, 678, 676; 224/553

[56]  References Cited

U.S. PATENT DOCUMENTS

| | | |
|---|---|---|
| 827,199 | 7/1906 | White . |
| 2,448,413 | 8/1948 | Borghesi ................................. 248/194 |
| 3,562,446 | 2/1971 | Wolf ........................................ 179/152 |
| 5,318,257 | 6/1994 | Tani ....................................... 248/125.1 |
| 5,374,971 | 12/1994 | Clapp et al. ............................ 354/293 |
| 5,564,669 | 10/1996 | Wu ....................................... 248/346.01 |

FOREIGN PATENT DOCUMENTS

| | | |
|---|---|---|
| H09-001280 | of 0000 | Japan . |
| H09-03845 | of 0000 | Japan . |
| 628357 | 8/1949 | United Kingdom ........................ 52/83 |

OTHER PUBLICATIONS

"Kodak Compact Camera Stand", Kodak Price Catalog, Aug. 1971.
Connectix Corporation "Color QuickCam", 1996.

*Primary Examiner*—Ramon O. Ramirez
*Assistant Examiner*—Willie Berry, Jr.
*Attorney, Agent, or Firm*—David M. Woods

[57] ABSTRACT

A base assembly for supporting a digital camera includes a weighted plate having a frictional surface for contacting a supporting surface and constraining the camera relative to a horizontal orientation; a pivoting member having an extension for connecting to the camera and a pivot axis about which the camera can swivel relative to the base assembly; and a frictional pad molded upon a sheet metal spring positioned between the weighted plate and the pivoting member. The base assembly includes means for urging the pivoting member against the frictional pad so as to provide sufficient friction between the frictional pad and the pivoting member to constrain rotational motion of the camera in a vertical orientation.

11 Claims, 4 Drawing Sheets

BASE FOR A TETHERED DIGITAL CAMERA

CROSS-REFERENCE TO RELATED APPLICATON(S)

Reference is made to commonly assigned copending applications Ser. No. 08/712,692, entitled "Tethered Digital Motion/Still Camera Using Dual Mode Software Processing", filed Sep. 12, 1996 in the names of Wayne E. Prentice, Thomas N. Berarducci, and Kenneth A. Parulski; Ser. No. 08/712,704, entitled "Multi-Mode Digital Camera with Computer Interface Using Data Packets Combining Image and Mode Data", filed Sep. 12, 1996 in the names of Jay A. Endsley, Thomas N. Berarducci, and Wayne Prentice; Ser. No. 29/059,534, entitled "Stand for an Electronic Camera", filed Sep. 12, 1996 in the names of Samuel F. Swayze, David G. Cooper, and Kevin R. Young; and Ser. No. 29/059,517, entitled "Electronic Camera", and filed Sep. 12, 1996 in the names of Samuel F. Swayze, David G. Cooper, and Kevin R. Young; each of which is assigned to the assignee of this application.

FIELD OF THE INVENTION

The invention relates generally to the field of electronic photography, and in particular to a stand for a digital camera.

BACKGROUND OF THE INVENTION

A digital camera that is tethered by a cable to a computer (i.e., the camera functions only when it is connected to the computer) is typically located on a user's computer monitor or desktop. Usually the camera is pointed at the user— especially for video conferencing applications. The Color QuickCam™ camera sold by the Connectix Corporation is typical of this type of camera. The QuickCam™ camera is spherical in shape and comes with a rubber base that loosely cradles the camera. One problem with this arrangement is that it is difficult to position the camera on its base such that it has good horizontal alignment with the scene. Another problem is that the cable on the camera sometimes exerts sufficient force so as to move the camera relative to its base. Some camera bases incorporate a pivot on them to restrict one rotational degree of freedom so as to help the horizontal misalignment problem. Other cameras are permanently attached to the base which makes them bulkier and more difficult to manipulate. The need is for a relatively small base that allows easy manipulation of the camera while firmly holding the camera in place with regard to a chosen vertical and horizontal alignment.

SUMMARY OF THE INVENTION

The present invention is directed to overcoming one or more of the problems set forth above. Briefly summarized, according to one aspect of the present invention, a base assembly for supporting a digital camera includes a weighted base having a frictional surface for contacting the supporting surface and constraining the camera relative to a horizontal orientation; a pivoting member having an extension for connecting to the camera and a pivot axis about which the camera can swivel relative to the base assembly; and a frictional pad assembly positioned between the weighted base and the pivoting member. In particular, the frictional pad assembly includes a frictional pad formed upon a section of a spring element. The base assembly includes means for urging the pivoting member against the frictional pad assembly so as to provide sufficient friction between the frictional pad and the pivoting member to constrain rotational motion of the camera in a vertical orientation.

The invention involves a combination of features that result in a superior base design which prevents the assembly from slipping on a table top or monitor. A low center of gravity also makes the base assembly heavy despite its small size. Together, these features prevent a cable, which attaches the camera to a computer, from pushing or pulling the base assembly out of place. A frictional force that is applied to the pivoting part of the base helps establish good vertical alignment with the scene and makes it easy to swivel the camera for pointing, but hard enough so that the camera stays where a user puts it (the weight of the cable will not overcome the pivot frictional force).

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging systems and devices are well known, the present description will be directed in particular to elements forming part of, or cooperating more directly with, apparatus in accordance with the present invention. Elements not specifically shown or described herein may be selected from those known in the art. While the invention is described in relation to a digital camera, it should be appreciated that it may be applied to any type of camera.

Figure 1:
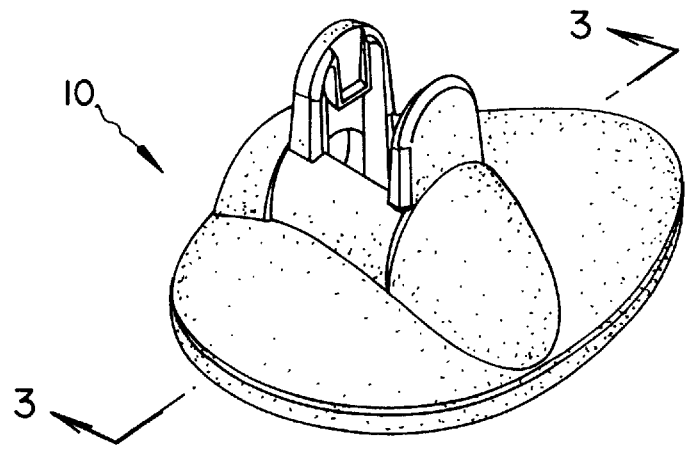
FIG. 1 is a perspective view of a base for a tethered digital camera according to the invention.
Figure 5:
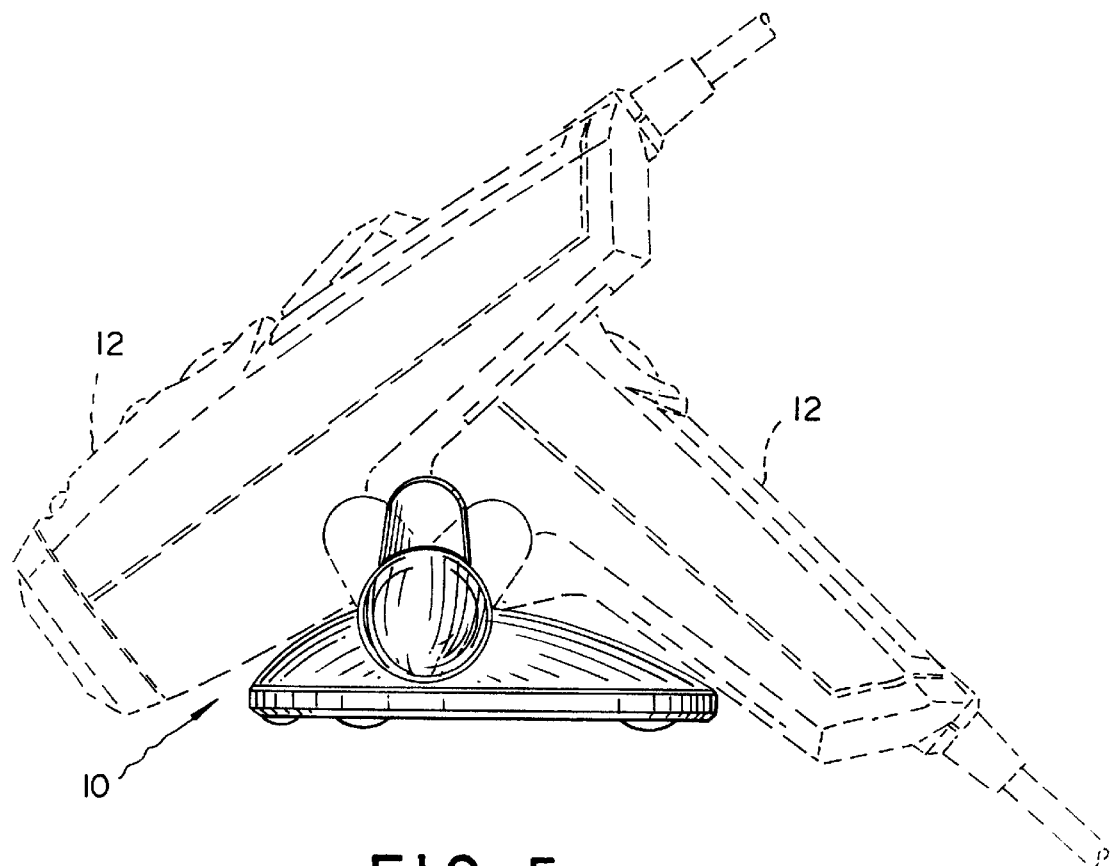
FIG. 5 is a further elaboration of the view shown in FIG. 4 showing the camera pivoted in two different positions relative to the base.
Figure 4:
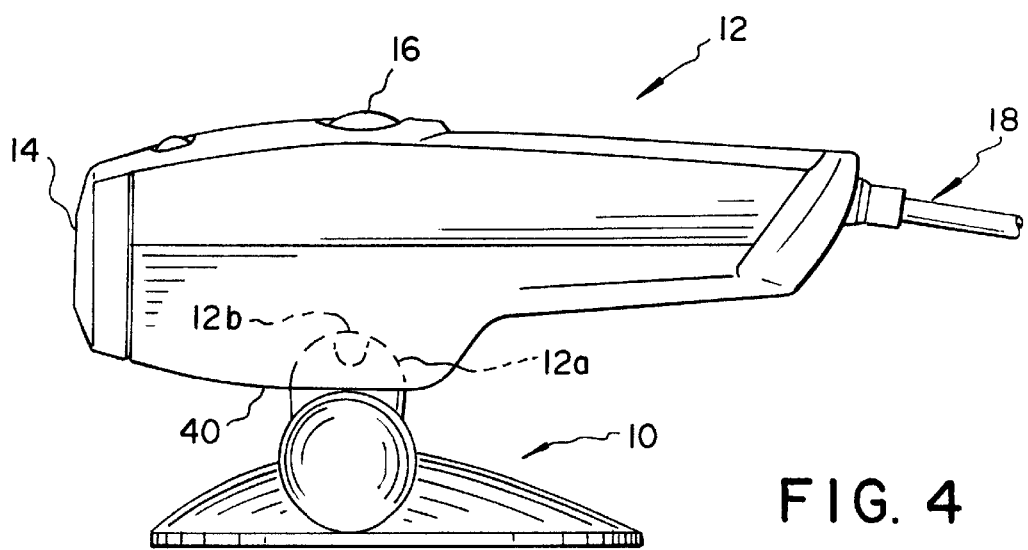
FIG. 4 is a view of the base shown in FIG. 1 attached to a tethered digital camera.

A perspective view of a base assembly 10 according to the invention is shown in FIG. 1, and the attachment of the base assembly 10 to a digital camera 12 is shown in FIG. 4. Referring first to FIG. 4, the camera 12 includes a lens 14 that is directed toward a subject (not shown) and a shutter button 16 on the topside for initiating an image capture sequence. The camera 12 also includes a cable 18 for connecting (tethering) the camera 12 to a host computer (not shown). The host computer, which is not part of this invention, typically controls the camera picture-taking process by setting the electronic exposure time and other processing requirements. As shown in FIG. 5, the camera 12 is able to swivel on the base assembly 10 to assume different capture positions (shown in dotted lines) relative to a subject.

Figure 3:
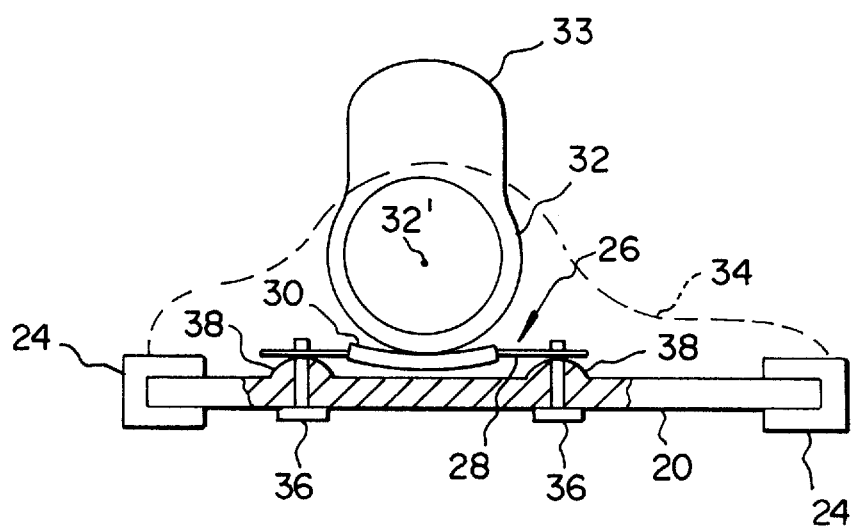
FIG. 3 is a cross-sectional view of the base shown in FIG. 1 taken along a line 3—3.
Figure 2:
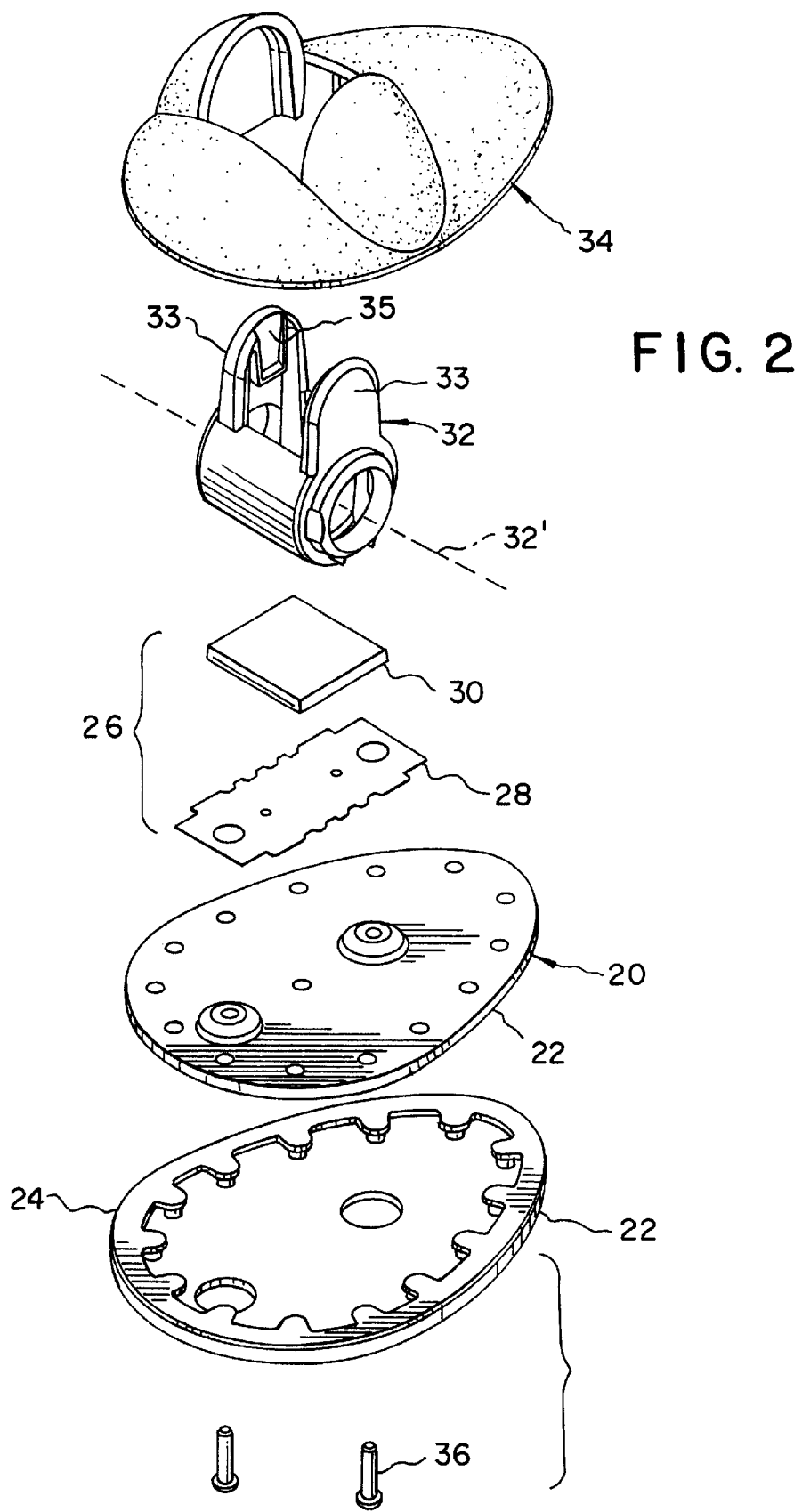
FIG. 2 is an exploded view of the components of the base shown in FIG. 1.

FIG. 2 shows an exploded view of the components of the base assembly 10, and FIG. 3 is a cross-sectional view taken along line 3—3 in FIG. 1 showing how the components are mounted together in a complete assembly. A weight plate 20 provides the majority of the weight to the base assembly 10. A rubber boot assembly 22 includes the weight plate 20 with a rubber ring 24 formed, e.g., by a conventional molding process, around the edges of the weight plate 20. The rubber boot assembly 22 provides sufficient frictional restraint to control the horizontal orientation of the camera 12 when the base assembly 10 is placed on a surface. A friction pad assembly 26 includes a friction spring 28 with a rubber pad 30 formed, e.g., by a conventional molding process, about the center of the spring 28.

Figure 6:
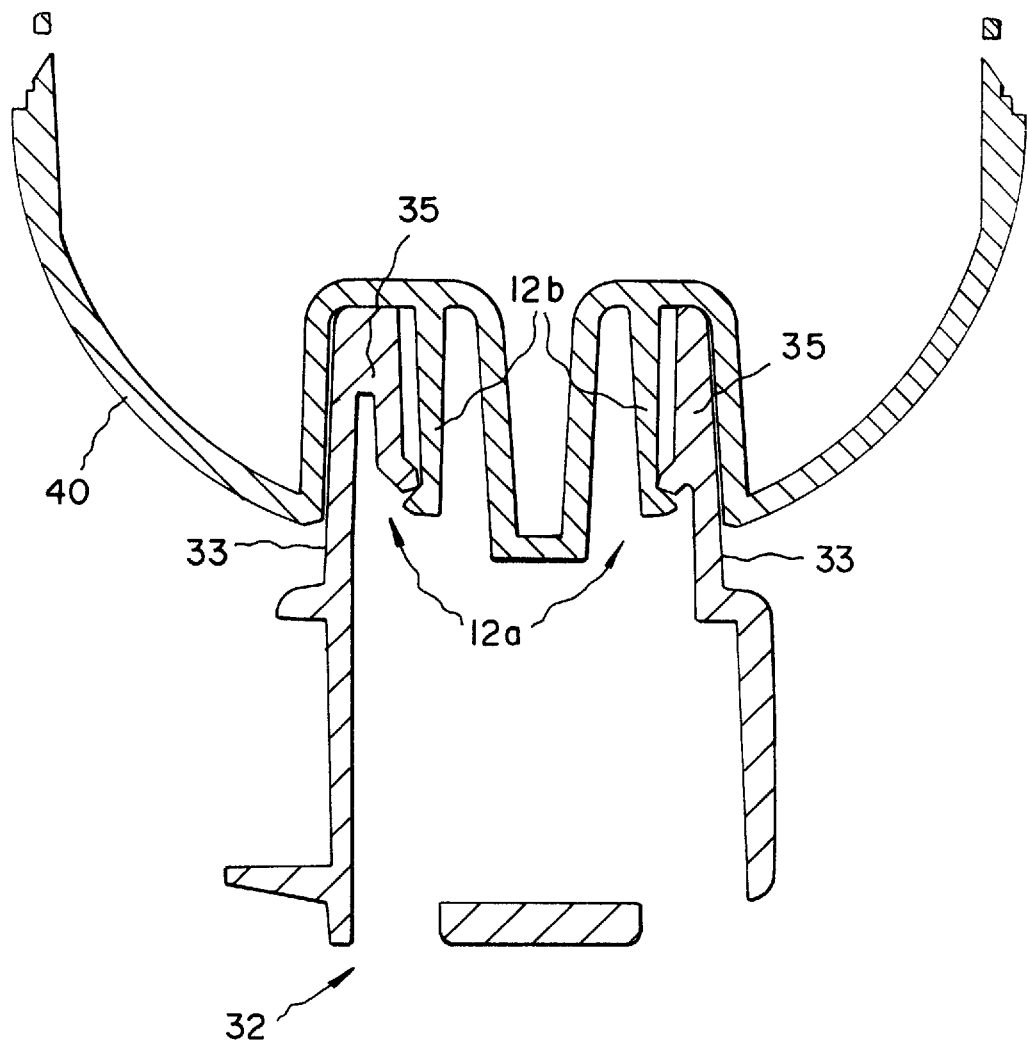
FIG. 6 is a cross section of the connection between the base and a bottom cover of the digital camera.

A base pivot 32 is mounted for pivoting relative to an axis 32' and includes two arcuate-edged side walls 33 that connect into slots 12a (see FIGS. 4 and 6) in a bottom cover 40 of the digital camera 12 for releasably attaching the camera 12 to the base assembly 10. A base enclosure 34 encloses the components of the base assembly 10, and constrains the rotational axis of the base pivot 32 while providing an aesthetic appearance. The base assembly 10 is fastened together with a pair of screws 36 which pass through the rubber boot assembly 22 and the friction pad assembly 26, and thread into the base enclosure 34. Each side wall 33 of the base pivot 32 includes a snap release feature 35 which snaps in place over a corresponding tab 12b (see FIG. 6) within each slot 12a in the camera 12. In this manner, the camera 12 may be easily attached to, and released from, the base assembly 10.

As shown in FIG. 3, the friction pad assembly 26 is mounted on a pair of raised surfaces 38 on the weight plate 20 such that there is clearance for the friction spring 28 to flex when the base pivot 32 is assembled against the friction pad assembly 26. The rubber pad 30 provides enough frictional force to the base pivot 32 to make it easy to swivel the camera by hand while allowing the camera to remain firmly in place after a position is selected. The friction spring 28 is made of sheet metal, which helps to make the frictional force more consistent through life and less susceptible to mechanical creep (caused by elevated temperature).

In use, the base assembly 10 supports a digital camera 12 on a surface, such as a table top or the top of a monitor. The rubber boot assembly 22 on the bottom of the base assembly 10 prevents the base assembly 10 from slipping on the table top or monitor. Furthermore, the weight plate 20 makes the base assembly 10 heavy despite its small size. This weight in combination with the rubber boot assembly 22 helps prevent the cable 18 from pushing or pulling the base assembly 10 out of place. The pivoting base pivot 32 helps establish good vertical alignment with the scene. The frictional force that is applied to the base pivot 32 by the friction pad assembly 26 makes it easy to swivel the camera 12 (for re-aiming the camera), but hard enough so that the camera 12 stays where a user puts it (the weight of the cable will not overcome the pivot frictional force). Snap release features 35 on the base pivot 32 and the bottom of the digital camera 12 allows for quick and easy attachment and detachment from the base assembly 10. This allows the user to comfortably hand hold the camera 12 without having a bulky and heavy base attached.

The invention has been described with reference to a preferred embodiment. However, it will be appreciated that variations and modifications can be effected by a person of ordinary skill in the art without departing from the scope of the invention. For example, while the connection to the camera has been shown as side wall extensions 33 from the base pivot 32, the extensions may alternatively extend from the bottom cover 40 of the camera into slots in the base pivot 32 where the snap release features would then be located.

PARTS LIST
10 base assembly
12 digital camera
12a slot
12b tab
14 lens
16 shutter button
18 cable
20 weight plate
22 rubber boot assembly
24 rubber ring
26 friction pad assembly
28 friction spring
30 rubber pad
32 base pivot
34 base enclosure
35 snap release feature
36 screws
38 raised surface
40 bottom cover

What is claimed is:

1. A base assembly for supporting a camera on a supporting surface relative to vertical and horizontal orientations thereof, said base assembly comprising:

a weighted base having a frictional surface for contacting the supporting surface and constraining the camera relative to the horizontal orientation;

a pivoting member having means for connecting to the camera, said pivoting member having a pivot axis about which the camera can swivel relative to the base assembly;

a frictional pad assembly positioned between the weighted base and the pivoting member, said frictional pad assembly including a frictional pad formed around at least part of a spring element; and means for urging the pivoting member against the frictional pad assembly so as to provide sufficient friction between the frictional pad and the pivoting member to constrain rotational motion of the camera in the vertical orientation.

2. A base assembly as claimed in claim 1 wherein the frictional surface of the weighted base is a rubber element formed around an edge of the weighted base.

3. A base assembly as claimed in claim 2 wherein the rubber element is a rubber boot molded around the edge of the weighted base.

4. A base assembly as claimed in claim 1 wherein the spring element is a sheet metal spring.

5. A base assembly as claimed in claim 4 wherein the frictional pad is molded around a central portion of the sheet metal spring.

6. A base assembly as claimed in claim 1 wherein the means for urging the pivoting member against the frictional pad assembly comprises an enclosure for enclosing the pivoting member and the frictional pad assembly against the weighted base.

7. A base assembly as claimed in claim 1 wherein said means for connecting to the camera comprises an extension from the pivoting member and the camera includes at least one slot for receiving the extension on the pivoting member.

8. A base assembly as claimed in claim 7 wherein the extension includes a snap release feature for releasably engaging a tab within the slot in the camera, whereby the camera may be easily attached to, or released from, base assembly.

9. A base assembly for supporting a camera on a supporting surface relative to vertical and horizontal orientations thereof, wherein the camera includes at least one slotted area for receiving an extension protruding from the base assembly which releasably attaches the camera to the base assembly, said base assembly comprising:

a weighted base having a frictional surface for contacting the supporting surface and constraining the camera relative to the horizontal orientation;

a pivoting member having an extension for connecting to the camera, said pivoting member having a pivot axis about which the camera can swivel relative to the base assembly and wherein the extension includes a snap release feature for releasably engaging the slotted area in the camera whereby the camera may be easily attached to, or released from, base assembly;

a frictional pad positioned between the weighted base and the pivoting member, said frictional pad being formed around at least part of a sheet metal spring;

means for attaching the sheet metal spring to the weighted base such that there is sufficient clearance for the sheet metal spring to flex; and an enclosure for enclosing the pivoting member, the frictional pad, and the weighted base whereby said enclosure further urges the pivoting member against the frictional pad to flex the sheet metal spring and thereby provide sufficient friction between the frictional pad and the pivoting member to constrain rotational motion of the camera in the vertical orientation.

10. A base assembly as claimed in claim 9 wherein the frictional surface of the weighted base is a rubber element molded around an edge of the weighted base.

11. A base assembly as claimed in claim 9 wherein the frictional pad is molded around a central portion of the sheet metal spring.

* * * * *